United States Patent [19]
Fujiwara et al.

[11] Patent Number: 4,994,920
[45] Date of Patent: Feb. 19, 1991

[54] DEVICE FOR FOCUS DETECTION WITH WEIGHTINGS OF THE FOCUS DETECTING SIGNALS OF PLURAL FOCUS DETECTORS

[75] Inventors: Akihiro Fujiwara; Masamichi Toyama; Hirofumi Suda, all of Kanagawa; Kunihiko Yamada, Tokyo, all of Japan

[73] Assignee: Canon Kabushiki Kaisha, Tokyo, Japan

[21] Appl. No.: 403,188

[22] Filed: Sep. 5, 1989

Related U.S. Application Data

[63] Continuation of Ser. No. 121,624, Nov. 17, 1987.

[30] Foreign Application Priority Data

Nov. 19, 1986 [JP] Japan .............................. 61-275828

[51] Int. Cl.$^5$ ............................................. H04N 5/232
[52] U.S. Cl. ..................................... 358/227; 358/166; 250/201.2
[58] Field of Search ......................... 358/227, 166, 37; 250/201

[56] References Cited

U.S. PATENT DOCUMENTS 4,544,953 10/1985 Goldman ............................. 358/227
4,609,944 9/1986 Nakada et al. ...................... 358/227
4,717,959 1/1988 Isago ................................... 358/227

Primary Examiner—Edward L. Coles, Sr.
Assistant Examiner—Robert M. Bauer
Attorney, Agent, or Firm—Robin, Blecker, Daley & Driscoll

[57] ABSTRACT

A focus detecting device arranged to evaluate the focused state of an object's image by using an image signal obtained from an image sensor comprises: a first detecting circuit which detects the maximum differential value of the image signal; a second detecting circuit which detects the width of an edge part of the object's image; and an evaluation circuit which is arranged to evaluate the focused state of said object's image by suitably combining, according to a focused degree detected, the detection values produced from the first and second detecting circuits.

38 Claims, 4 Drawing Sheets

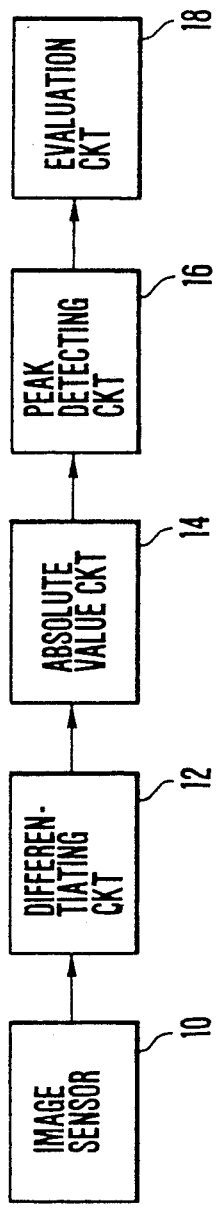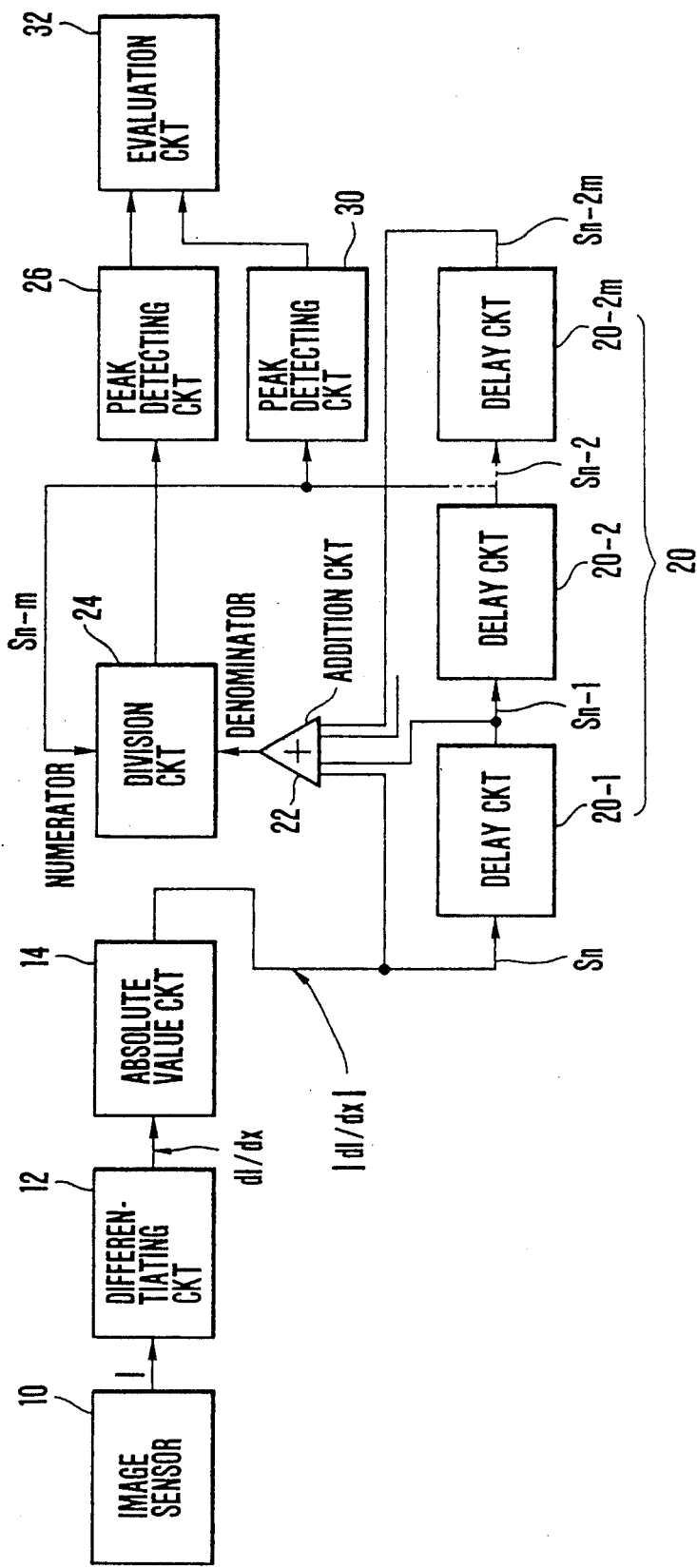

FIG. 3(a)
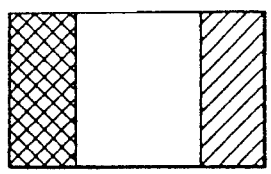
IN FOCUS / \ OUT OF FOCUS
FIG.3(b-1)        FIG.3(b-2)
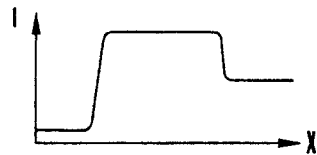 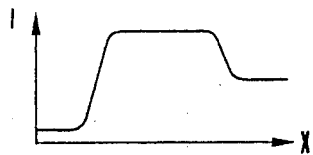
FIG.3(c-1)        FIG.3(c-2)
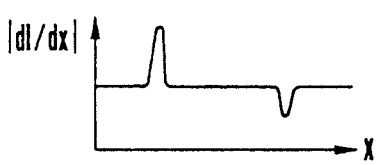 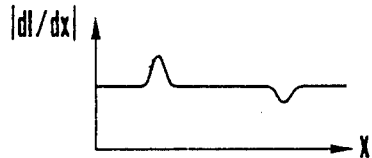
FIG.3(d-1)        FIG.3(d-2)
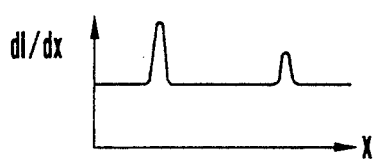 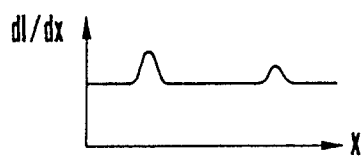
FIG.3(e-1)        FIG.3(e-2)
OUTPUT OF CKT 22      OUTPUT OF CKT 22
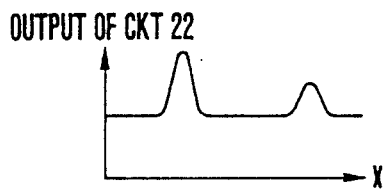 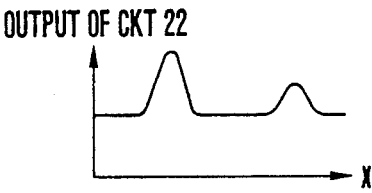
FIG.3(f-1)        FIG.3(f-2)
OUTPUT OF CKT 26      OUTPUT OF CKT 26
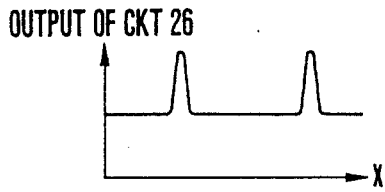 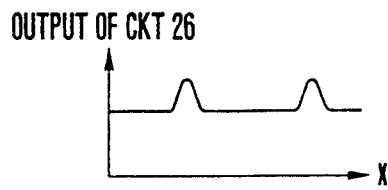

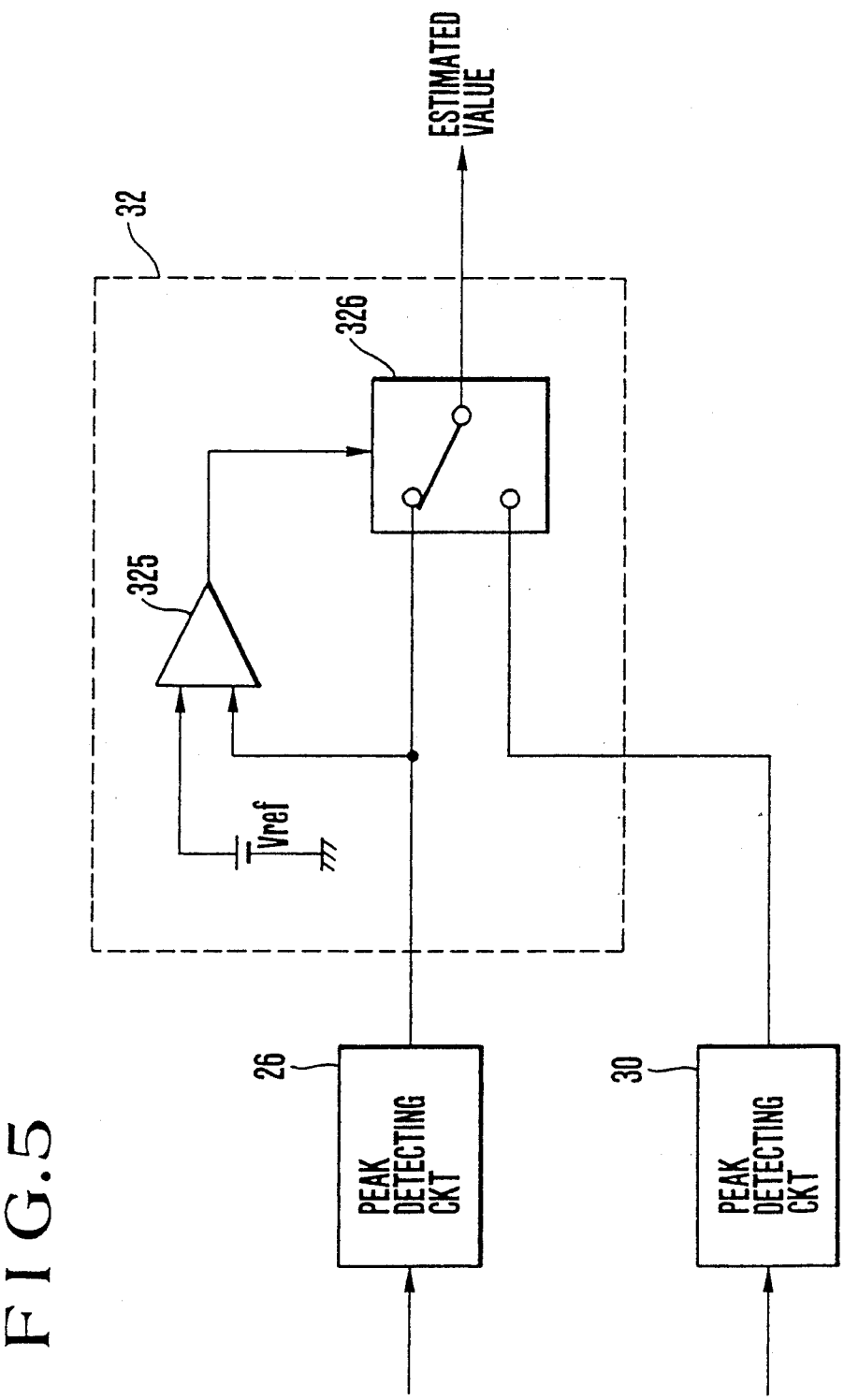

DEVICE FOR FOCUS DETECTION WITH WEIGHTINGS OF THE FOCUS DETECTING SIGNALS OF PLURAL FOCUS DETECTORS

This application is a continuation, of application Ser. No. 121,624, filed 11/17/87.

BACKGROUND OF THE INVENTION

1. Field of the Invention

This invention relates to a focus detecting device for detecting an in-focus state by using an image signal produced from an image sensor.

2. Description of the Related Art

In the field of apparatuses for forming electrical image signals representing images of objects to be pictured by means of CCD image sensors such as video cameras, etc., there has been known an automatic focusing method of adjusting the focal point of an optical system by evaluating the sharpness of the object's image from the image signal. The conventional focus detecting circuit for carrying out this method is arranged as shown in FIG. 1 of the accompanying drawings. An image signal from an image sensor 10 is differentiated by a differentiating circuit 12. The absolute value of the differentiated signal is then obtained by an absolute value circuit 14. The peak value of the differentiated absolute value signal is detected by a peak detecting circuit 16. The peak value thus obtained is evaluated by an evaluation circuit 18. This method utilizes the fact that the larger the peak value is, the closer the optical system to an in-focus point and that the peak value reaches the largest value at the in-focus point. In another method which is similar to this, a high frequency component is extracted from the image signal and the sharpness of the object image is judged from the amplitude of the extracted component.

With regard to the focus detecting devices of this kind, a method called "a hill climbing servo method" which is described in detail, for example, in "NHK GIJUTSU KENKYU," 1965, Vol. 17, No. 1, Whole No. 86, page 21 to 37, is well known among others.

The focus detecting methods of the above stated kind, however, give an evaluated or estimated sharpness value (peak value or amplitude value of a high frequency component) which fluctuates with the kind or contrast of the object. They are, therefore, incapable of making absolutely reliable focus detection. To ensure a reliable result of such focus detection, therefore, it is necessary to make a final determination after evaluated values obtained from consecutive images (fields or frames) are compared with each other.

To remove the shortcoming of the above stated focus detecting methods, there has been proposed another method, which is disclosed in U.S. patent application Ser. No. 922,740, filed Oct. 24, 1986, which is assigned to the same assignee as that of the present application. In the case of this method, importance is attached to image parts obtained from the edge parts, such as the contour, etc., of an object. An estimated value of sharpness of the object is obtained from a ratio between the brightness gradient and brightness difference of the edge parts of the image. This estimated or evaluated value absolutely represents the focused state of the optical system. The method obviates the necessity of comparing the evaluated values obtained from consecutive images and permits focus detection from a single piece of image. The same method is also employed in a device disclosed in U.S. patent application Ser. No. 046,252, filed May 5, 1987, and assigned also to the same assignee as that of the present application.

However, in detecting edge width, the range within which this method is capable of making accurate detection is limited to a relatively narrow range around an in-focus point due to a problem relative to an evaluation value computing circuit. Therefore, the automatic focusing device likely comes out of control while the optical system is out of focus. Meanwhile, in the case of the conventional focus detecting method of FIG. 1, the automatic focusing device is advantageous in controlling the optical system toward its in-focus point in its out-of-focus state. However, the device tends to cause hunting or the like in the neighborhood of the in-focus point and is, therefore, incapable of performing sufficiently stable control.

Further, the patent application cited above also discloses another focus detecting device which is arranged to take the advantages of the above stated two different methods and to mutually offset their shortcomings. However, this device includes many things that still remain to be improved.

SUMMARY OF THE INVENTION

It is an object of this invention to provide a focus detecting device which solves all the above stated problems of the prior art devices and is capable of accurately and stably detecting an in-focus point of an optical system both when the position of an optical system is greatly deviating from the in-focus point and when that of the optical system is in the proximity of the in-focus point despite of its simplified structural arrangement.

To attain this object, a focus detecting device embodying this invention comprises image sensing means which is arranged to convert information on an object's image formed on an image sensing plane into an electrical image signal; differentiating means for differentiating the image signal obtained from said image sensing means; first detecting means arranged to detect the maximum value of a differential signal of the differentiating means obtained from within a detecting area set on the image sensing plane; second detecting means arranged to detect from the differential signal the width of an edge part of the object's image formed within the detecting area; and evaluating means arranged to discriminate an in-focus state of the object's image on the image sensing plane on the basis of detection values of the first and second detecting means.

The device according to this invention includes detecting means which is arranged to obtain two evaluation values, based on different focus detecting principles, from the differential signal obtained by differentiating the image signal produced from an image sensing device. The device is, therefore, capable of forming a control signal apposite to focusing control with simple structural arrangement. The invention thus gives an automatic focusing device which is arranged taking the advantages of different detecting methods and in which the shortcoming of one method is complemented by the advantage of the other. More specifically, the advantageous feature of the hill climbing method mentioned in the foregoing is utilized while its unnatural behavior taking place in the proximity of an in-focus point which is considered to be the intrinsic shortcoming of the hill climbing method is removed by the edge width detecting method. It is another advantage of the invention that, despite of a combined embodiment of the hill climbing method and the edge width detecting method, the circuit arrangement is simplified by the common use of the circuit elements required for the two methods.

The above and other objects and features of the invention will become apparent from the following detailed description of embodiments thereof taken in connection with the accompanying drawings.

BRIEF DESCRIPTION OF THE DRAWINGS

FIG. 1 is a block diagram showing an example of the conventional focus detecting device.

FIG. 2 is a block diagram showing the arrangement of a focus detecting device embodying this invention.

FIGS. 3(a) to 3(f−2) show the wave forms of signals produced from the various parts of FIG. 2.

FIG. 5 is a block diagram showing another example of the arrangement of the evaluating means included in the focus detecting device.

DETAILED DESCRIPTION OF THE PREFERRED EMBODIMENTS

Figure 4:
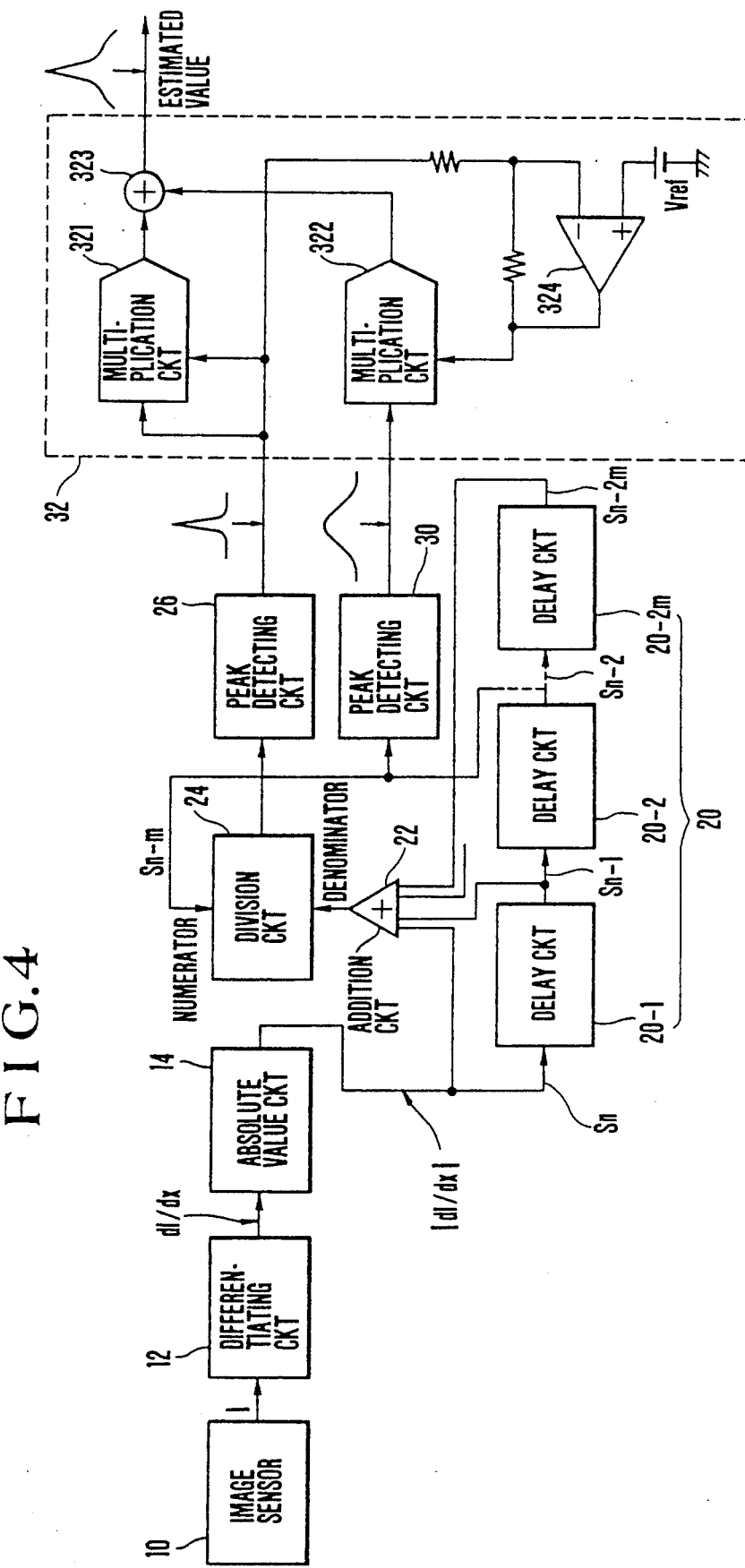
FIG. 4 is a block diagram showing by way of example the arrangement of evaluating means included in the focus detecting device according to this invention.

An embodiment of this invention is described below with reference to the accompanying drawings:

FIG. 2 shows the embodiment in a block diagram. The illustration includes an image sensor 10, a differentiating circuit 12 and an absolute value circuit 14, which are identical with the corresponding elements shown in FIG. 1 respectively. The output Sn of the absolute value circuit 14 is applied to a multi-stage delay circuit 20 consisting of delay circuits 20-1, 20-2, —and 20-2m, each having a given delaying degree. The outputs Sn-1, Sn-2, —, Sn-m, — and Sn-2m of these delay circuits are added to the output Sn of the absolute value circuit 14 by an addition circuit 22. The output of the addition circuit 22 indicates a difference (or a ratio) in brightness between one point and preceding and ensuing points of the image signal obtained at each point of the signal, i.e. a degree of variation in brightness. The output Sn-m of the delay circuit 20-m which is in the middle part of the delay circuit 20 is applied to the numerator input terminal of a division circuit 24. The output of the addition circuit 22 is applied to the denominator input terminal of the division circuit 24. The output of the division circuit 24 indicates the above stated ratio obtained at each point of the image signal within one image plane. A peak detecting circuit 26 is arranged to detect the maximum value of the ratio, or an estimated or evaluation value of the focused state of a part corresponding to an edge part of the object's image. The focus evaluation value, which is based on the edge width of the image, is normalized with the varying degree of contrast by the computing operation of the above stated division circuit 24 and is, therefore, unaffected by variations in contrast. The embodiment is thus capable of obtaining an extremely accurate focus evaluation value.

A peak detecting circuit 30 functions in the same manner as the peak detecting circuit 16 of FIG. 1. The circuit 30 is arranged to receive the central output Sn-m of the delay circuit 20 and to produce a maximum peak value obtained within a focus detecting area. An evaluation circuit 32 is arranged to receive the output of the peak detecting circuit 26 and that of another peak detecting circuit 30 and to determine a focused degree of an image sensing optical system obtained at each point of time. In other words, the circuit 32 determines the optical system to be in an in-focus position or out of focus and, if it is out of focus, the defocused degree. Then, in accordance with the result of the focus evaluation, a suitable control signal is supplied as applicable to an adjustment device, such as a lens driving motor) provided for the image sensing optical system.

Referring to FIGS. 3(a) to 3(f−2), the operation of the circuit of FIG. 2 is as follows: FIG. 3(a) shows an edge figure representing an object to be photographed. In this case, the output I of the image sensor 10 shows sharp changes if the optical system is in focus as shown in FIG. 3(b−1); and, if not, it shows dull changes as shown in FIG. 3(b−2). The output of the differentiating circuit 12 is then obtained as shown in FIG. 3(c−1) or 3(c−2). The output of the absolute value circuit 14 is as shown in FIG. 3(d−1) or 3(d−2). The output of the addition circuit 22 is as shown in FIG. 3(e−1) or 3(e−2). The output of the division circuit 24 is as shown in FIG. 3(f−1) or 3(f−2). The peak detecting circuit 26 detects the peak value from the signal of the wave form of FIG. 3(f−1) or 3(f−2). The peak detecting circuit 30 detects the peak value from the signal of the wave form of FIG. 3(d−1) or 3(d−2).

The peak value of the output of the absolute value circuit 14 increases according as the position of the optical system comes closer to an in-focus point and reaches its maximum value upon arrival of it at the in-focus point. Therefore, the optical system can be automatically controlled to obtain the maximum value in accordance with the known hill climbing method. A focus evaluation value obtained by this method fluctuates with changes in the contrast of the object, as mentioned in the foregoing. This method is, therefore, inadequate for an absolute discrimination between an in-focus state and a defocused state. However, a great advantage of this method resides in that, in the case of out of focus, the focus evaluation value smoothly changes according as a focusing lens is shifted. In view of that, in accordance with this invention, the output of the peak detecting circuit 30 is used as an focus evaluation value signal for adjustment of the optical system in cases where the position of the optical system is deviating from an in-focus point.

Meanwhile, the peak detecting circuit 26 is arranged to detect the peak value of the signal of FIG. 3(f−1) or 3(f−2) as mentioned above. The detection value thus obtained indicates a maximum value at an in-focus point. The value thus obtained is an absolute value and is independent of the contrast of the object. The use of this value obviates the necessity of determining a focused degree by comparing relative changes resulting from fine adjustment of the focusing lens position, because: As apparent from the wave form shown, in respect of the pulse wave form appearing in the output of the absolute value circuit 14, the height of the pulse is normalized with the area of the pulse and thus can be used as an absolute evaluation value in determining a focused state. In this instance, the optical system can be regarded as in focus when the detected edge width reaches a minimum value. This width is about equal to the diameter of an inherent minimum circle of confusion determined by the optical system, the image sensing system, etc. However, the possible range of evaluation by this method is limited by the dynamic range of the denominator input of the division circuit 24. This method is, therefore, inapposite to a case where the optical system is greatly out of focus.

Therefore, in accordance with this invention, the evaluation circuit 32 is arranged to make an overall estimate by suitably combining the evaluation made from the peak value of the absolute value signal and the evaluation made from the peak value of the normalized signal. The outputs of the two peak detecting circuits 26 and 30 are added together with some weight attached to obtain the overall estimated value. The combined evaluation may be made, for example, by increasing the evaluation weight for the output of the peak detecting circuit 26 according as the position of the optical system comes closer to the in-focus point.

FIG. 4 shows the internal arrangement of the evaluation circuit 32. The outputs of the two peak detecting circuits 26 and 30 are added together with some weight attached in obtaining the above stated overall estimated value. Referring to FIG. 4, multiplication circuits 321 and 322 are connected respectively to the peak detecting circuits 26 and 30. An addition circuit 323 is arranged to add together the outputs of the two multiplication circuits 321 and 322 and to produce the result of addition. A focus detecting range detector 324 is arranged to compare the output of the peak detecting circuit 26 with a given level Vref to detect the focused degree relative to an in-focus point and to supply the multiplication circuit 322 with a coefficient according to the result of detection. The detector 324 is formed by an operational amplifier. The circuit arrangement of the evaluation circuit being such, the output of the peak detecting circuit 26 is further multiplied by the output thereof by the multiplication circuit 321. Meanwhile the output of the peak detecting circuit 30 is multiplied by the output of the operational amplifier 324 at the multiplication circuit 322. Therefore, the weight of the output of each detecting circuit is controlled according to the output (a detection value relative to the focused degree) of the peak detecting circuit 26.

When the optical system is greatly deviating from an in-focus point, the output of the peak detecting circuit 26 becomes close to zero and focus detection is hardly possible due to its narrow dynamic range. Under that condition, therefore, no detection value is obtainable from the output of the multiplication circuit 321. The input at the inverting input terminal of the operational amplifier 324 becomes less than the given value Vref. Then, a given output of the amplifier 324 is applied to the multiplication circuit 322. Then, the output of the peak detecting circuit 30 is multiplied by the output value of the amplifier 324 to increase the weight of the output of the circuit 30. The output of the circuit 322 thus obtained is supplied to the addition circuit 323. As a result of this, the evaluation circuit 32 comes to produce a focus evaluation value based on the output of the peak detecting circuit 30.

When the position of the optical system comes close to the in-focus point, the peak detecting circuit 26 produces an output of a finite value. This causes the potential at the inverted input terminal of the operational amplifier 324 to increase and the output level of the amplifier 324 to decrease. Then, the coefficient by which the output of the peak detecting circuit 30 is to be multiplied becomes smaller to decrease the weight of the output. The weight of the output of the peak detecting circuit 30 decreases according as the in-focus point becomes closer. Then, at a point in close proximity to the in-focus point, the output of the peak detecting circuit 26 becomes a value twice as great as the detection value thereof and is supplied in the doubled value to the addition circuit 323.

FIG. 5 shows another example of arrangement of the evaluation circuit 32 according to this invention including only the internal arrangement thereof. In the case of this embodiment, the output of the peak detecting circuit 26 is compared with a given reference value Vref by a comparator 325. In case that the output of the peak detecting circuit 26 is found to be less than the reference value Vref thus indicating that the optical system is much deviating from an in-focus point, the connecting position of a switch 326 is shifted to the other peak detecting circuit 30 and the detection value produced from the peak detecting circuit 30 is employed as focus estimated value. When the focusing position of the optical system comes closer to the in-focus point the output of the peak detecting circuit 26 increases accordingly. Then, when the output of the circuit 26 comes to exceed the reference value Vref, the output of the comparator 325 is inverted to change the connecting position of the switch 326 from the peak detecting circuit 30 over to the peak detecting circuit 26. The detection value of the circuit 26 then becomes the focus estimated value. In short, the output of the peak detecting circuit 26 is used only when the focused state of the optical system is in the proximity of an in-focus point and that of the other peak detecting circuit 30 is used in all cases other than that.

The embodiments are arranged either to select one of the outputs of the peak detecting circuits 26 and 30 or to change the weighting applied to these outputs according to the focused degree of the optical system enhances the focus detecting accuracy. In other words, compared with an arrangement which merely adds the outputs of the two peak detecting circuits 26 and 30 together, the arrangement of the embodiments described effectively prevents the output of the circuit 26 from being influenced by the output of the other circuit 30 which tends to be affected by the contrast of the object.

In another conceivable method, the output of the peak detecting circuit 26 is used only for making a discrimination as to whether or not an in-focus point is attained; and the output of the other peak detecting circuit 30 is used for control over the rotating speed and rotating direction of a focusing lens driving motor.

In each of the embodiments described, the peak of the output of the absolute value circuit 14 is detected by the peak detecting circuit 30 through the delay circuit 20 to obtain a first evaluation value. However, this arrangement may be changed to use an integrated value of the output of the absolute value circuit 14. Further, the peak of the output of the division circuit 24 is detected by the peak detecting circuit 26 to use it as a second evaluation value. This arrangement, however, may be changed to compare the output of the division circuit 24 with a given threshold value and to obtain the evaluation value by counting the number of times for which the output exceeds the threshold value.

As understood from the foregoing description, in accordance with this invention, the advantageous feature of the so-called hill climbing method is utilized while the unnatural behavior which takes place in the neighborhood of an in-focus point and is considered to be an intrinsic shortcoming of the hill climbing method is effectively removed by virtue of the combined use of the edge width detecting method. Despite of the combined use of the two different methods, the circuit arrangement is simplified by the common use of circuit elements required by these methods .

What is claimed is:

1. A focus detecting device comprising:
   (a) image sensing means arranged to convert information on an object's image formed on an image sensing plane into an electrical image signal;
   (b) differentiating means for differentiating said image signal obtained from said image sensing means;
   (c) first detecting means arranged to detect the maximum value of a differential signal of said differentiating means obtained from within a detecting area set on the image sensing plane;
   (d) second detecting means arranged to detect from said differential signal the width of an edge part of said object's image formed within said detecting area; and
   (e) evaluating means arranged to discriminate an in-focus state of said object's image on said image sensing plane on the basis of detection values of said first and second detecting means, said evaluating means including means for evaluating a focused state on the basis of the detection values of said first and second detecting means by weighting them according to the focused degree of said focused state.

2. A device according to claim 1, wherein said first detecting means is arranged to detect the maximum absolute value of the output of said differentiating means.

3. A device according to claim 1, wherein said second detecting means is arranged to produce a maximum detection value when the edge width of the object's image as detected from said differentiating signal is at its smallest value.

4. A device according to claim 3, wherein the value obtained by said second detecting means on the basis of the edge width of said object's image is a value normalized with variations in luminance for the purpose of preventing said value from being affected by the contrast of said object's image.

5. A device according to claim 1, wherein said second detecting means is arranged to produce a detection value which is obtained in such a manner that the absolute value of a diffential value produced at an arbitrary point of time from said differentiating means is divided by a value which is obtained by adding together the differential values produced from said differentiating means at a plurality of points of time including said arbitrary point of time and preceding and ensuing points of time.

6. A device according to claim 5, wherein said second detecting means includes a plurality of series-connected delay circuits which are arranged to delay the differential value of said differentiating means, an addition circuit arranged to add together the outputs of said plurality of delay circuits including the output of said differentiating means and a division circuit which is arranged to divide the output of the middle delay circuit located in the middle part among said plurality of delay circuits by the output of said addition circuit, said second detecting means being arranged to produce the output of said division circuit as a detection value.

7. A device according to claim 6, wherein said first detecting means is arranged to produce, as a detection value, the maximum value of the output of said middle delay circuit among said plurality of delay circuits.

8. A device according to claim 1, wherein said first and second detecting means have different dynamic ranges.

9. A device according to claim 1 or 8, wherein said evaluating means is arranged to evaluate the focused state of said object's image on the basis of the detection values of said first and second detecting means by suitably and differently combining said detection values for a focused state which is in the proximity of an in-focus point from other focused states.

10. A device according to claim 9, wherein said evaluating means is arranged to evaluate said focused state on the basis of the sum of said detection values of said first and second detecting means.

11. A device according to claim 10, wherein said evaluating means is arranged to produce a focus estimated value obtained by weighting the detection values of said first and second detecting means according to a detected focused degree before they are added together.

12. A device according to claim 11, wherein said weighting is performed according to a focused degree detected by one of said first and second detecting means; and the weight of the detection value of said second detecting means is increased if said focused degree is within the dynamic range of said second detecting means and the weight of the detection value of said first detecting means is increased if said focused degree is outside of said dynamic range of said second detecting means.

13. A device according to claim 9, wherein said evaluating means is arranged to evaluate said focused state on the basis of the detection value of said first detecting means or that of said second detecting means by changing the use of them from one over to the other according to whether said focused degree is within or outside the dynamic range of said first and second detecting means which is nearest to the in-focus point.

14. A device according to claim 13, wherein said evaluating means is arranged to evaluate said focused state on the basis of the focus detection value obtained by said first detecting means when the focused state is outside of the dynamic range of said second detecting means relative to an in-focus point or on the basis of the focus detection value obtained by said second detecting means when the focused state is within the dynamic range of said second detecting means.

15. A device according to claim 14, wherein said evaluating means is arranged to detect whether or not said focused state is within or outside of the respective dynamic ranges of said first and second detecting means and to accordingly select one of said detection values for focus evaluation.

16. A focus detecting device comprising:
   (a) image sensing means arranged to convert information on an object's image formed on an image sensing plane thereof into an electrical image signal;
   (b) first detecting means for detecting a focused state of said object's image through said image signal obtained from said image sensing means;
   (c) second detecting means which has a different focus detecting characteristic from said first detecting means and is arranged also to detect the focused state through said image signal obtained from said image sensing means; and
   (d) evaluating means arranged to discriminate an in-focus state of said object's image on said image sensing plane on the basis of detection values obtained by said first and second detecting means, said evaluating means including means for evaluating a focused state on the basis of the detection values of said first and second detecting means by weighting them according to the focused degree of said focused state.

17. A device according to claim 16, wherein said first detecting means is arranged to detect the maximum absolute values of differential values obtained from said image signal.

18. A device according to claim 17, wherein said second detecting means is arranged to detect the edge width of said object's image obtained from said differential signal.

19. A device according to claim 18, wherein the detection value obtained by said second detecting means on the basis of said edge width is a value normalized with variations in luminance in such a way as to be unaffected by the constant of said object's image.

20. A device according to claim 19, wherein said first and second detecting means have different focus detecting ranges relative to said in-focus point.

21. A device according to claim 20, wherein said weighting is performed according to a focused degree detected by one of said first and second detecting means; and the weight of the detection value of said second detecting means is increased if said focused degree is within said range of said second detecting means and weight of said first detecting means is increased if said focused degree is outside of said range of said second detecting means.

22. A device according to claim 20, wherein said evaluating means is arranged to detect whether or not said focused degree is within or outside of said range of said second detecting means relative to an in-focus point according to one of the detection values of said first and second detecting means and to evaluate the focused state by using the detection value of said second detecting means if said focused degree is within said range of said second detecting means, and, if not, by using the detection value of said first detecting means.

23. A device according to claim 16, wherein said first and second detecting means have different focus detecting ranges relative to the in-focus point; and said evaluating means is arranged to adjust the detree of weighting applied to the detection value of each of said detecting means according to whether or not said focused degree is within the respective range thereof.

24. A focus detecting device comprising:
(a) image sensing means arranged to convert information on an object's image formed on an image sensing plane thereof into an electrical image signal;
(b) first detecting means arranged to detect a focused degree from a given signal component of said image signal obtained from said image sensing means and to have the focus detecting range thereof set within a given range in the proximity of an in-focus point;
(c) second detecting means arranged to detect a focused degree from a given signal component of said image signal obtained from said image sensing means and to have the focus detecting range thereof set at a range narrower than that of said first detecting means; and
(d) evaluating means for evaluating the focused state of said object's image on said image sensing plane on the basis of the detection values obtained from said first and second detecting means, said evaluating means including means for evaluating a focused state on the basis of the detection values of said first and second detecting means by weighting them according to the focused degree of said focused state.

25. A device according to claim 24, wherein said first and second detecting means operate on different focus detecting principles and have different focus detecting characteristics from each other.

26. A device according to claim 25, wherein said first detecting means is arranged to detect the maximum differential values of said image signal which is produced by said image sensing means and is obtained from within a detecting areas set on said image sensing plane; and said second detecting means is arranged to detect, from said differential values, the minimum vale of width of an edge part of said object's image.

27. A focus detecting device comprising:
(a) image sensing means arranged to convert an information on an object's image formed on an image sensing plane into an electrical signal;
(b) differentiating means for differentiating said image signal obtained from said image sensing means;
(c) detecting means arranged to detect from a differential signal the width of an edge part of said object's image formed within a detecting area set on the image sensing plane, said detecting means being arranged to produce a detection value which is obtained in such a manner that the absolute value of a differential value produced at an arbitrary point of time from said differentiating means is divided by a value which is obtained by adding together the differential values produced from said differentiating means at a plurality of points of time including said arbitrary point of time and preceding and ensuing points of time; and
(d) evaluating means arranged to discriminate an in-focus state of said object's image on said image sensing plane on the basis of a detection value provided by said detecting means.

28. A device according to claim 27, further comprising:
another detecting means for detecting the maximum value of the differential signal of said differentiating means obtained from within said detecting area; and
evaluating means arranged to discriminate said in-focus state on the basis of detection values provided by each such detecting means.

29. A device according to claim 28, wherein said detecting means includes a plurality of series-connected delay circuits which are arranged to delay the differential value of said differentiating means, an addition circuit arranged to add together the outputs of said plurality of delay circuits including the output of said differentiating means and a division circuit which is arranged to divide the output of the middle delay circuit located in the middle part among said plurality of delay circuits by the output of said addition circuit, such other detecting means being arranged to produce the output of said division circuit as a detection value.

30. A device according to claim 28, wherein said weighting is performed according to a focused degree detected by one of said detecting means; and the weight of the detection value of such other detecting means is increased if said focused degree is within a dynamic range thereof and the weight of said first-mentioned detecting means is increased if said focused degree is outside of said dynamic range of said other detecting means.

31. A focus detecting device comprising:
(a) image sensing means arranged to convert an information of an object's image formed on an image sensing plane into a electrical image signal;
(b) first detecting means for detecting a focused condition of said object's image on the basis of said image signal obtained from said image sensing means;
(c) second detecting means for detecting a focused condition of said object's image on the basis of said image signal obtained from said image sensing means, said second detection means having a focus detecting characteristic different from that of said first detecting means; and
(d) evaluating means for evaluating the focused condition on the basis of the detecting values of said first and second detecting means, said evaluating means having means for suitably weighting outputs of said first and second detecting means according to the output of said first or second detecting means or according to the outputs of said first and second detecting means and having discriminating means for discriminating an in-focus condition of said object's image on the image sensing plane on the basis of said weighted outputs of said first and second detecting means.

32. A device according to claim 31, wherein said first detecting means is arranged to detect the maximum value of a differential signal differentiated from said image signal output from said image sensing means.

33. A device according to claim 32, wherein said second detecting means is arranged to detect the width of an edge part of said object's image on said image sensing plane.

34. A device according to claim 33, wherein said weighting means is arranged to proximity weight the outputs of said first and second detecting means according to the output of said second detecting means.

35. A device according to claim 31, wherein said weighting means is arranged to weight the outputs of said first and second detecting means according to the one of the outputs of said first and second detecting means.

36. A focus detecting device comprising:
(a) image sensing means arranged to convert an information of an object's image formed on an image sensing plane into an electrical image signal;
(b) first detecting means for detecting a focused condition of said object's image on the basis of said image signal obtained from said image sensing means;
(c) second detecting means for detecting the focused condition of said object's image on the basis of said image signal obtained from said image sensing means, said second detecting means having a focus detecting range different from that of said first detecting means;
(d) evaluating means for evaluating the focused condition on the basis of the detecting values of said first and second detecting means, said evaluating means having means for proximity selecting one of the outputs of said first and second detecting means according to the output of said first or second detecting means and having discriminating means for discriminating an in-focus condition of said object's image on the image sensing plane on the basis of said selected output of said first and second detecting means.

37. A device according to claim 36, wherein said first detecting means is agganged to detect the maximum value of a differential signal differentiated from said image signal output from said image sensing means.

38. A device according to claim 37, wherein said second detection means is arranged to detect the width of an edge part of said object's image on said image sensing plane, said selecting means proximity selecting one of the outputs of said first and second detecting means according to the output of said second detecting means and said discriminating means discriminating an in-focus condition of said object's image on the image sensing plane.

* * * * *